No. 752,963. PATENTED FEB. 23, 1904.
L. C. ELLISON.
COTTON PLANTER.
APPLICATION FILED JULY 27, 1903.
NO MODEL.
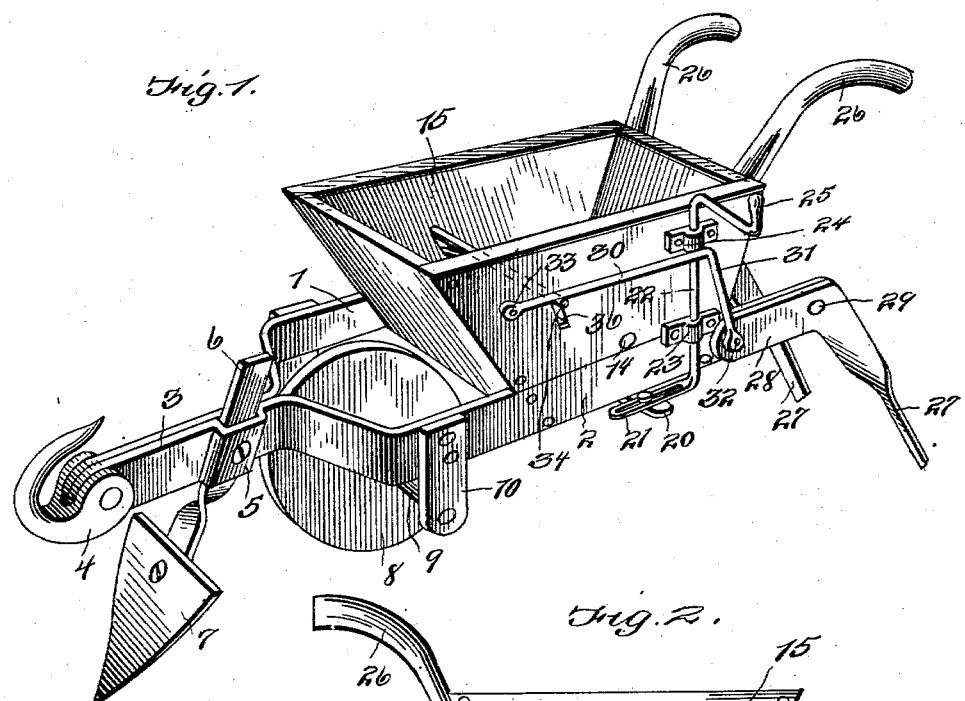
Witnesses
R. A. Boswell
A. G. Miller
Inventor
L. C. Ellison,
By W. S. Fitz——
Attorneys No. 752,963. Patented February 23, 1904.

UNITED STATES PATENT OFFICE.

LUTHER C. ELLISON, OF DUNDEE, GEORGIA.

COTTON-PLANTER.

SPECIFICATION forming part of Letters Patent No. 752,963, dated February 23, 1904.

Application filed July 27, 1903. Serial No. 167,146. (No model.)

*To all whom it may concern:*

Be it known that I, LUTHER C. ELLISON, a citizen of the United States, residing at Dundee, in the county of Fayette and State of Georgia, have invented certain new and useful Improvements in Cotton-Planters; and I do hereby declare the following to be a full, clear, and exact description of the invention, such as will enable others skilled in the art to which it appertains to make and use the same.

My invention relates to cotton-planters and fertilizer-distributers; and it consists of certain novel features of construction and combination of parts, the preferred form whereof will be hereinafter set forth.

The object of my invention is to provide a simple though reliably-efficient form of machine which will not only perform the work of planting cotton-seed any desired depth, but will also distribute fertilizer at the time the seed is deposited, the quantity of fertilizer being regulated or controlled by mixing the desired quantity with the seed to be planted and the proper adjustment of the discharge-opening.

Other objects and advantages will be made clearly apparent, reference being had to the accompanying drawings, which are made a part of this application, and in which—

Figure 1 is a perspective view of my invention complete ready for use. Fig. 2 is a side elevation thereof. Fig. 3 is a central sectional view of the hopper, showing the seed-agitating feeding-wheel and also showing the discharge-opening through which the seed and the fertilizer pass; and Fig. 4 is a transverse section through the hopper.

Referring to the various details of my invention numerals will be employed, the same numeral applying to a corresponding part throughout the several views.

1 and 2 designate portions of the framework of my machine which may be made of any preferred material, and if formed of iron are so bent at their forward ends as to form the front extension 3, to which the clevis 4 of any preferred form may be secured. The extension 3 is also provided with a seat 5, adapted to receive the shank 6 of the front plow-shovel 7, said shovel being designed to open up the furrow, into which the fertilizer and the seed will be deposited. I also provide the guiding or carrying wheel 8, mounted upon the axle 9, which fits suitable bearings in the lower ends of the brackets 10. Upon the outer end of the shaft 9 I also secure the driving sprocket-wheel 11, which carries the sprocket-chain 12, and which latter extends around the sprocket-wheel 13 upon the outer end of the shaft 14. The shaft 14 extends through the hopper-section 15, and centrally thereon I secure the feeding-disk 16, mounted in the hopper above the discharge-opening 17. The discharge-opening 17 is provided upon each side with the guideways 18, adapted to receive the movable closure or slide 19, which extends outwardly to one side and is provided with the extension 20 and designed to be pivotally connected to the slotted arm 21 of the controlling-shaft 22, said shaft having suitable seats or bearings, as indicated by the numerals 23 and 24.

The upper end of the shaft 22 is provided with a crank arm or extension 25, said crank extension constituting a handle by which the shaft 22 may be partially turned in its bearings, and thereby cause the sliding closure 19 to be moved in or out when it is desired to increase or diminish the size of the discharge-opening beneath the feeding-disk 16.

At the rear of the hopper and connected to the frame-section in any preferred way I provide the handles 26, by which the planter may be easily connected by the operator.

The frame-sections 1 and 2 are extended rearwardly sufficiently to afford a seat whereby the blades 27 may be pivotally connected thereto. The blades 27, as will be seen, are provided at their upper ends with the angular extension or inwardly-directed arm 28. As will be seen by reference to Fig. 1, the pivot-point of the blades 27 is indicated by the numeral 29, which leaves the forward end of the arm 28 to play upwardly and downwardly when the blade 27 engages an obstruction, and in order to hold the arm 28 normally in the same plane with the side sections 1 or 2 I provide the controlling-spring 30, having the depending branch 31, the lower end of which is pivotally connected to the arm 28, as indicated by the numeral 32. The forward end of the controlling-spring 30 is pivoted to a contiguous part of the hopper-section, as designated by the numeral 33. The controlling-spring 30 rests upon the end of the shaft 34, which extends through the hopper-section from side to side, so as to support the springs for both of the blades 27, it being understood that there is to be one of said springs for each side of the hopper. The shaft 34 is provided on the central part with the depending branch 35, which reaches down into the hopper in front of the feeding disk or wheel 16, the office of said arm being to insure that the seed, fertilizer, or other contents of the hopper shall not become clogged in front of the feeding-wheel, and thus obstruct the feeding process.

In order that the arm 35 may be moved slightly upward and downward, I prefer to mount each end of the shaft 34 upon a supporting-spring 36, and it therefore follows that the shaft 34 will be caused to vibrate or move slightly upward and downward upon said springs 36 incident to the operation of the blades 27. If, for instance, the blades 27 meet with any obstruction incident to the use thereof, the controlling-spring 30 will be drawn downward, incidentally drawing the shaft 34 down upon the springs 36 and moving the arm 35 up and down in advance of the feeding-wheel, thereby tending to overcome any clogging of the discharge-orifice 17.

If preferred, a delivering-chute may be properly connected with the discharging-orifice 17, said chute extending downward into the furrow formed by the shovel 7, as will be readily understood.

Believing that the advantages and manner of using my improved cotton-seed planter and fertilizer-distributer have thus been made clearly apparent, further description is deemed unnecessary.

Having thus fully described my invention, what I claim as new, and desire to secure by Letters Patent, is—

The herein-described planter and fertilizer-distributer, comprising a suitable carrying-frame; a hopper mounted upon said frame; a feeding-disk operatively disposed in said hopper above a discharging-orifice provided therein; a carrying-wheel 8; suitable sprocket-wheels 11 and 13 and connecting means therefor, in combination with a furrow-forming shovel and coöperating blades 27 adapted to cover said furrow after the seed has been deposited therein; controlling-springs 30 operatively connected with said blades; a shaft 34 extending through the hopper-section adapted to support said springs, an arm 35 carried by said shaft, and cushioning devices for said shaft adapted to vibrate said arm 35 in advance of the feeding-wheel and thereby remove all disintegrating, adhering masses of seeds, &c., all combined substantially as specified.

In testimony whereof I affix my signature in presence of two witnesses.

LUTHER C. ELLISON.

Witnesses:
M. L. STINCHCANCH,
T. N. SLATON.